(12) United States Patent
Lambert et al.

(10) Patent No.: US 11,651,077 B2
(45) Date of Patent: May 16, 2023

(54) SYSTEMS AND METHODS FOR PROVIDING SECURED BOOT AND SCAN FOR DEVICES WITH LIMITED ACCESS

(71) Applicant: Dell Products L.P., Round Rock, TX (US)

(72) Inventors: Timothy M. Lambert, Austin, TX (US); Jun Gu, Austin, TX (US); Arun Muthaiyan, Round Rock, TX (US); Pablo R. Arias, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 197 days.

(21) Appl. No.: 17/155,788

(22) Filed: Jan. 22, 2021

(65) Prior Publication Data
US 2022/0237298 A1    Jul. 28, 2022

(51) Int. Cl.
G06F 21/57 (2013.01)
G06F 11/07 (2006.01)

(52) U.S. Cl.
CPC ........ G06F 21/575 (2013.01); G06F 11/0793 (2013.01); G06F 21/572 (2013.01)

(58) Field of Classification Search
CPC ....... G06F 21/57; G06F 21/572; G06F 21/575
See application file for complete search history.

(56) References Cited

U.S. PATENT DOCUMENTS

| | | | | |
|---|---|---|---|---|
| 10,534,918 | B1* | 1/2020 | Davidi | G06F 21/577 |
| 10,536,538 | B2* | 1/2020 | Munjal | H04L 67/52 |
| 10,860,305 | B1* | 12/2020 | Harland | H03K 19/177 |
| 2016/0019058 | A1* | 1/2016 | Hu | H04L 67/10 |
| | | | | 717/124 |
| 2017/0302640 | A1* | 10/2017 | Maletsky | H04L 9/3242 |
| 2018/0285121 | A1* | 10/2018 | Lambert | G06F 9/4405 |
| 2018/0322012 | A1* | 11/2018 | Sharma | G06F 11/0793 |
| 2019/0199735 | A1* | 6/2019 | Gosla | H04L 63/1441 |
| 2020/0250072 | A1* | 8/2020 | Kwon | G06F 8/77 |
| 2021/0211272 | A1* | 7/2021 | Miyamae | H04L 9/3239 |
| 2021/0216477 | A1* | 7/2021 | Schramm | G06F 21/575 |
| 2022/0179960 | A1* | 6/2022 | Spangler | H04L 9/3239 |

* cited by examiner

*Primary Examiner* — Jaweed A Abbaszadeh
*Assistant Examiner* — Cheri L Harrington
(74) *Attorney, Agent, or Firm* — Jackson Walker L.L.P.

(57) ABSTRACT

An information handling system may include a host system comprising a host system processor and a management controller communicatively coupled to the host system processor and configured to perform out-of-band management of a plurality of devices of the information handling system, and further configured to, during a powering on of the host system randomly select a subset of one or more devices of the plurality of devices for partial validation of firmware of the plurality of devices, randomly select a plurality of offsets associated with the one or more devices for partial verification of the firmware, and perform verification of the one or more devices at the plurality of offsets.

21 Claims, 4 Drawing Sheets

SYSTEMS AND METHODS FOR PROVIDING SECURED BOOT AND SCAN FOR DEVICES WITH LIMITED ACCESS

TECHNICAL FIELD

The present disclosure relates in general to information handling systems, and more particularly to methods and systems for providing secured boot and scan for devices with limited access within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are equipped with management controllers for providing out-of-band management of information handling system devices. For example, a management controller may be configured to perform management of information handling system devices when a host system of the information handling system is powered off. Such management of devices may include, for example, maintaining firmware versions of attached devices, ensuring security and validation of firmware versions, and ensuring secure boot of attached devices.

However, for a management controller to validate firmware images of attached devices, the management controller may require sideband communication with a microcontroller of each of the attached devices in order to read firmware memory. Often, such sideband interfaces are of low-bandwidth (e.g., one or two wires) and firmware sizes may be large enough that verification of firmware for multiple firmware devices may require a significant amount of time, which may add significant time to host system boot, which may negatively affect user experience.

SUMMARY

In accordance with the teachings of the present disclosure, the disadvantages and problems associated with ensuring providing secured boot and scan for devices in an information handling system may be reduced or eliminated.

In accordance with embodiments of the present disclosure, an information handling system may include a host system comprising a host system processor and a management controller communicatively coupled to the host system processor and configured to perform out-of-band management of a plurality of devices of the information handling system, and further configured to, during a powering on of the host system randomly select a subset of one or more devices of the plurality of devices for partial validation of firmware of the plurality of devices, randomly select a plurality of offsets associated with the one or more devices for partial verification of the firmware, and perform verification of the one or more devices at the plurality of offsets.

In accordance with these and other embodiments of the present disclosure, a method may be provided for an information handling system comprising a host system comprising a host system processor and a management controller communicatively coupled to the host system processor and configured to perform out-of-band management of a plurality of devices of the information handling system. The method may include, during a powering on of the host system: randomly selecting, by the management controller, a subset of one or more devices of the plurality devices for partial validation of firmware of the plurality of devices; randomly selecting, by the management controller, a plurality of offsets associated with the one or more devices for partial verification of the firmware; and performing, by the management controller, verification of the one or more devices at the plurality of offsets.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system comprising a host system comprising a host system processor and a management controller communicatively coupled to the host system processor and configured to perform out-of-band management of a plurality of devices of the information handling system, during a powering on of the host system: randomly select, by the management controller, a subset of one or more devices of the plurality devices for partial validation of firmware of the plurality of devices; randomly select, by the management controller, a plurality of offsets associated with the one or more devices for partial verification of the firmware; and perform, by the management controller, verification of the one or more devices at the plurality of offsets.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
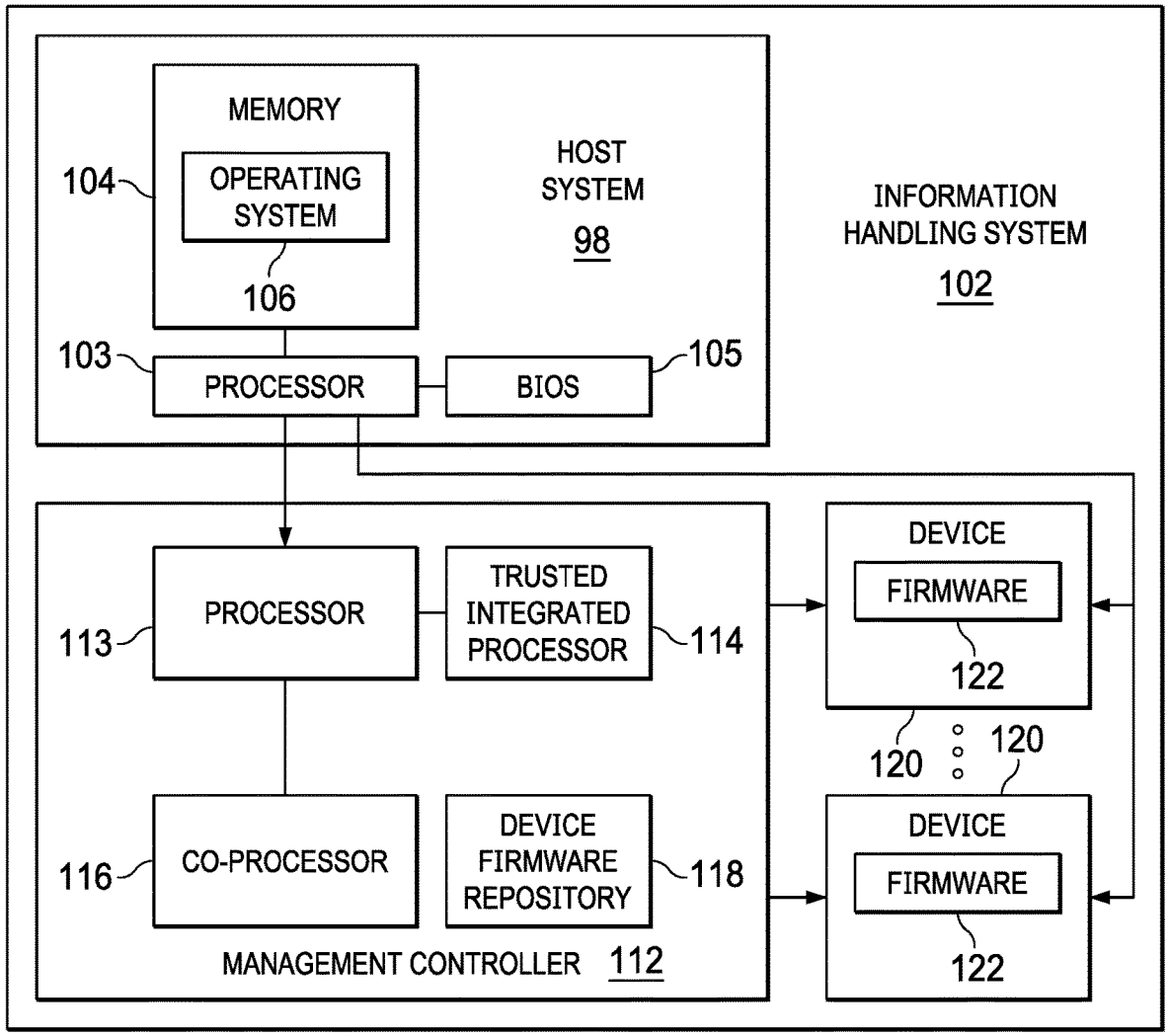
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 112 communicatively coupled to processor 103, and a plurality of devices 120 communicatively coupled to processor 103 and management controller 112. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state. Management controller 112 may include a processor 113 communicatively coupled to processor 103, a trusted integrated processor 114 communicatively coupled to processor 113, and a co-processor 116 communicatively coupled to processor 113. In certain embodiments, management controller 112 may include or may be an integral part of a baseboard management controller (BMC) or a remote access controller (e.g., a Dell Remote Access Controller or Integrated Dell Remote Access Controller). In these and other embodiments, management controller 112 may be referred to as a service processor or access controller.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

Trusted integrated processor 114 may comprise a crypto-processor or special co-processor configured to provide secured boot services and run-time security functions of management controller 112, including without limitation signature services, root of trust, external monitoring of a serial peripheral interface, secure handling of keys, and other functionality. In some embodiments, trusted integrated processor 114 may include a trusted platform module or similar device configured to carry out cryptographic operations on data communicated to it from processor 113 and/or another component of management controller 112.

Co-processor 116 may comprise a special-purpose processor used to supplement functionality of processor 113. For example, in some embodiments, co-processor 116 may comprise an input/output (I/O) processor for providing I/O operations with respect to other devices. In these and other embodiments, operations performed by co-processor 116 may include floating point arithmetic, graphics acceleration, signal processing, string processing, and/or encryption. Offloading of specialized tasks from processor 113 to co-processor 116 may accelerate performance.

As shown in FIG. 1, management controller 112 may also comprise a device firmware repository 118. Device firmware repository 118 may include verified images of firmware 122 of devices 120, or fingerprints/signatures of such verified images. Although shown in FIG. 1 as a computer-readable medium integral to management controller 112, in some embodiments, device firmware repository 118 may comprise a computer-readable medium accessible to management controller 112. As described in greater detail below, management controller 112 may perform verification of firmware 122 based on contents of device firmware repository 118.

Each device 120 may comprise any suitable system, device, or apparatus that may perform a specialized function that extends the functionality of information handling system 102. For example, a device 120 may comprise an input/output device (e.g., a solid state storage drive), a controller for controlling one or more of such input/output devices, or a backplane or similar device for coupling a plurality of such input/output devices to processor 103. As shown in FIG. 1, each device 120 may be coupled to processor 103 (e.g., via a data communications interface in which input/output data may be communicated between processor 103 and such device 120) and may be coupled to management controller 112 (e.g., via a management interface in which management commands and parameters may be communicated between management controller 112 and such device 120).

As shown in FIG. 1, each device 120 may include firmware 122. Firmware 122 for each device 120 may include a suitable program of instructions configured to, when executed by a controller of such device 120, perform all or part of a functionality of such device 120.

Figure 2:
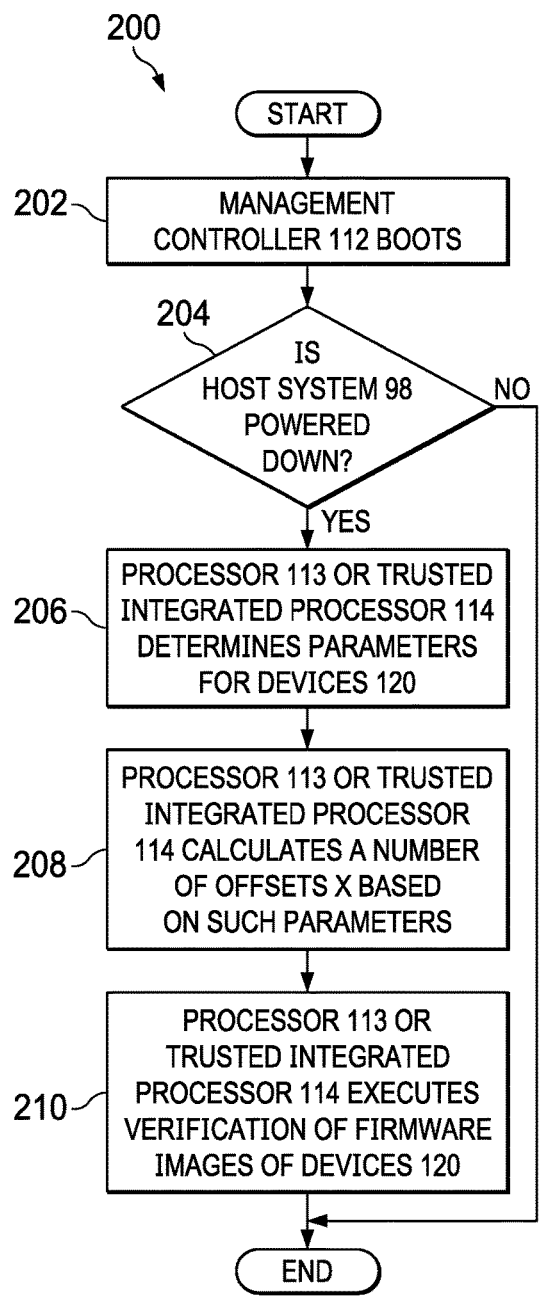
FIG. 2 illustrates a flow chart of a method for a secured boot and scan procedure that may occur upon a boot of a management controller, in accordance with embodiments of the present disclosure.

FIG. 2 illustrates a flow chart of a method 200 for a secured boot and scan procedure that may occur upon a boot of management controller 112, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may boot. At step 204, processor 113 or trusted integrated processor 114 may determine if host system 98 is powered down (e.g., in state S5). If host system 98 is powered down, method 200 may proceed to step 206. Otherwise, method 200 may end.

At step 206, processor 113 or trusted integrated processor 114 may determine parameters for devices 120. Such parameters may include a total time T available for verifying firmware images of devices 120, a number N of devices 120 present in the configuration of information handling system 102, and a data read transfer rate S (e.g., number of bytes that can be read per second). Based on such parameters, processor 113 or trusted integrated processor 114 may calculate further parameters such as a time per device 120 (e.g., T divided by N), and total bytes read per device (e.g., time per device divided by S). The parameters (e.g., T, N, and S) may be predefined based on a specification, memory size, and/or platform requirement of each device 120.

At step 208, processor 113 or trusted integrated processor 114 may calculate a number of offsets X based on such parameters T, N, and S. For example, the number of offsets X based on such parameters may be equal to the total bytes read per device divided by a constant number of bytes (e.g., 512 bytes).

At step 210, processor 113 or trusted integrated processor 114 may execute verification of firmware images 122 of devices 120 (e.g., in accordance with method 400 described below). Processor 113 or trusted integrated processor 114 may delay boot of host system 98 until verification of all firmware images 122 of devices 120 is complete, and any error detected may be corrected by re-imaging any non-verified images (e.g., from device firmware repository 118). After completion of step 210, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

The calculation set forth with respect to method 200 may divide the total available scan time T evenly among all devices N, regardless of an image size associated with each device, which may not be homogenous among the devices. So, in an example in which a first device has an image size of 1 kilobyte and second device has an image size of 8 kilobytes and 4 kilobytes can be read during the available time, the scan of the first device may complete with half of its allotted scan time wasted, while only 2 kilobytes of the 8 kilobytes of the second device may be scanned.

In lieu of the approach of method 200, processor 113 or trusted integrated processor 114 may alternatively be configured to read the same percentage of each devices image during a secured boot and scan procedure that may occur upon a boot of management controller 112. Thus, in the example of the previous paragraph, because the combined image size of the devices is 9 kilobytes and 4 kilobytes can be read, processor 113 or trusted integrated processor 114 may read 4/9≈44.4% of each of the first device and second device during the secured boot and scan procedure. Such alternative approach may constructively use all available scan time during the secured boot and scan procedure.

Figure 3:
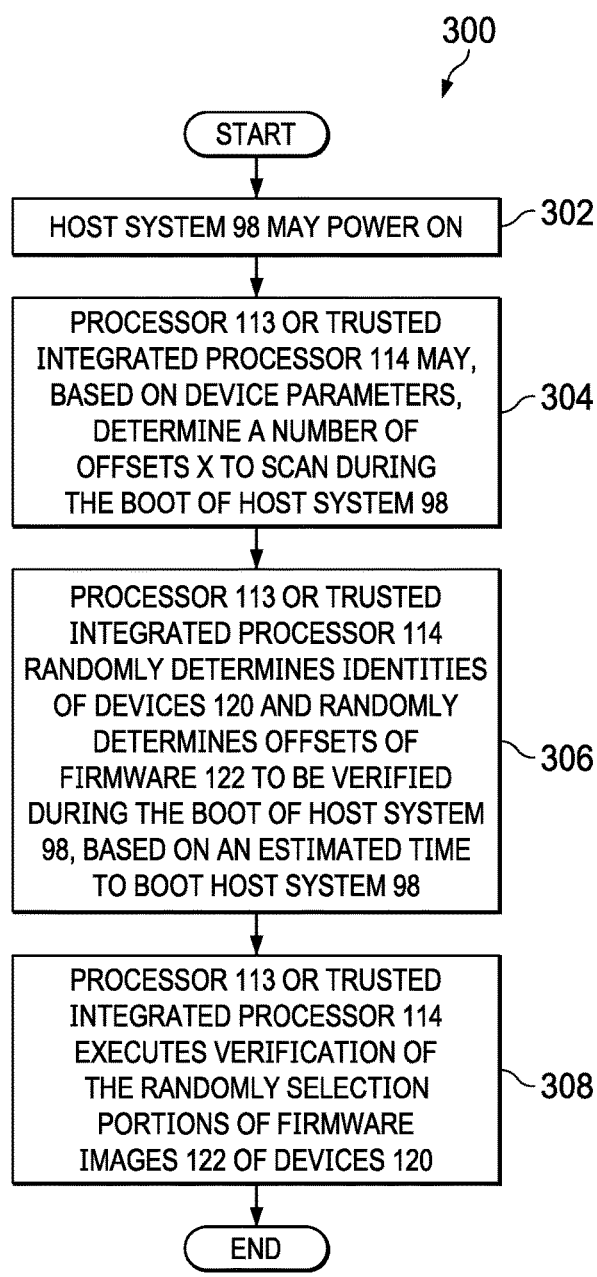
FIG. 3 illustrates a flow chart of a method for a secured boot and scan procedure that may occur upon powering on of a host system, in accordance with embodiments of the present disclosure.

FIG. 3 illustrates a flow chart of a method 300 for a secured boot and scan procedure that may occur upon powering on of a host system, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, host system 98 may power on (e.g., transition from state S5 to S0). At step 304, processor 113 or trusted integrated processor 114 may, based on device parameters (e.g., T, N, and S), determine a number of offsets X to scan during the boot of host system 98. At step 306, processor 113 or trusted integrated processor 114 may randomly determine identities of devices 120 and randomly determine offsets of firmware 122 to be verified during the boot of host system 98, based on an estimated time to boot host system 98.

At step 308, processor 113 or trusted integrated processor 114 may execute verification of the randomly selected portions of firmware images 122 of devices 120 (e.g., in accordance with method 400 described below). After completion of step 308, method 300 may end.

Method 300 may complete before boot completion of host system 98 (e.g., before transition to state S0), even if full verification of all firmware 122 is complete. However, processor 113 or trusted integrated processor 114 may halt boot of host system 98 if verification of a portion of firmware 122 fails, and re-image any affected firmware prior to allowing boot of host system 98. Accordingly, within the time available for verification, processor 113 or trusted integrated processor 114 may ensure that all available devices 120 may be scanned for at least a non-zero number of blocks, wherein such non-zero number may be user configurable.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
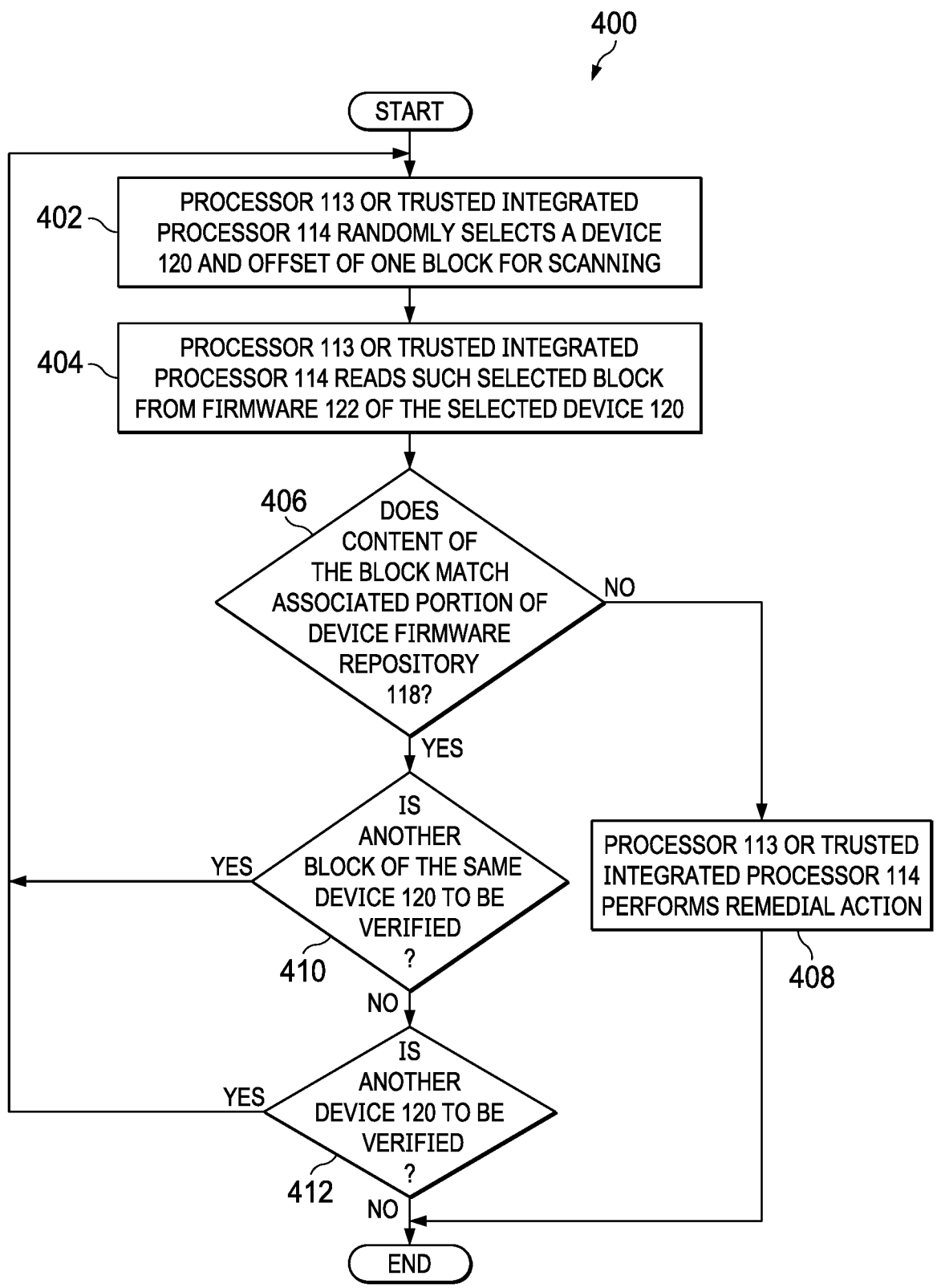
FIG. 4 illustrates a flow chart of a method for verifying firmware images of devices, in accordance with embodiments of the present disclosure.

FIG. 4 illustrates a flow chart of a method 400 for verifying firmware images of devices 120, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, processor 113 or trusted integrated processor 114 may randomly select a device 120 and offset of one block for scanning. At step 404, processor 113 or trusted integrated processor 114 may read such selected block from firmware 122 of the selected device 120. At step 406, processor 113 or trusted integrated processor 114 may compare the content of the block against the associated portion of device firmware repository 118. If the content matches, method 400 may proceed to step 410. Otherwise, method 400 may proceed to step 408.

At step 408, in response to a failure in the verification of a block of firmware 120, processor 113 or trusted integrated processor 114 may perform a remedial action. Such remedial action may include a logging of the failed verification, a re-imaging of the affected firmware 122, and/or any other suitable action. After completion of step 408, method 400 may end.

At step 410, in response to a successful verification of a block of firmware 120, processor 113 or trusted integrated processor 114 may determine if another block of the same device 120 is to be verified. If another block of the same device 120 is to be verified, method 400 may proceed again to 402. Otherwise, method 400 may proceed to step 412.

At step 412, processor 113 or trusted integrated processor 114 may determine if another device 120 is to be verified. If another device 120 is to be verified, method 400 may proceed again to 402. Otherwise, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

Figure 5:
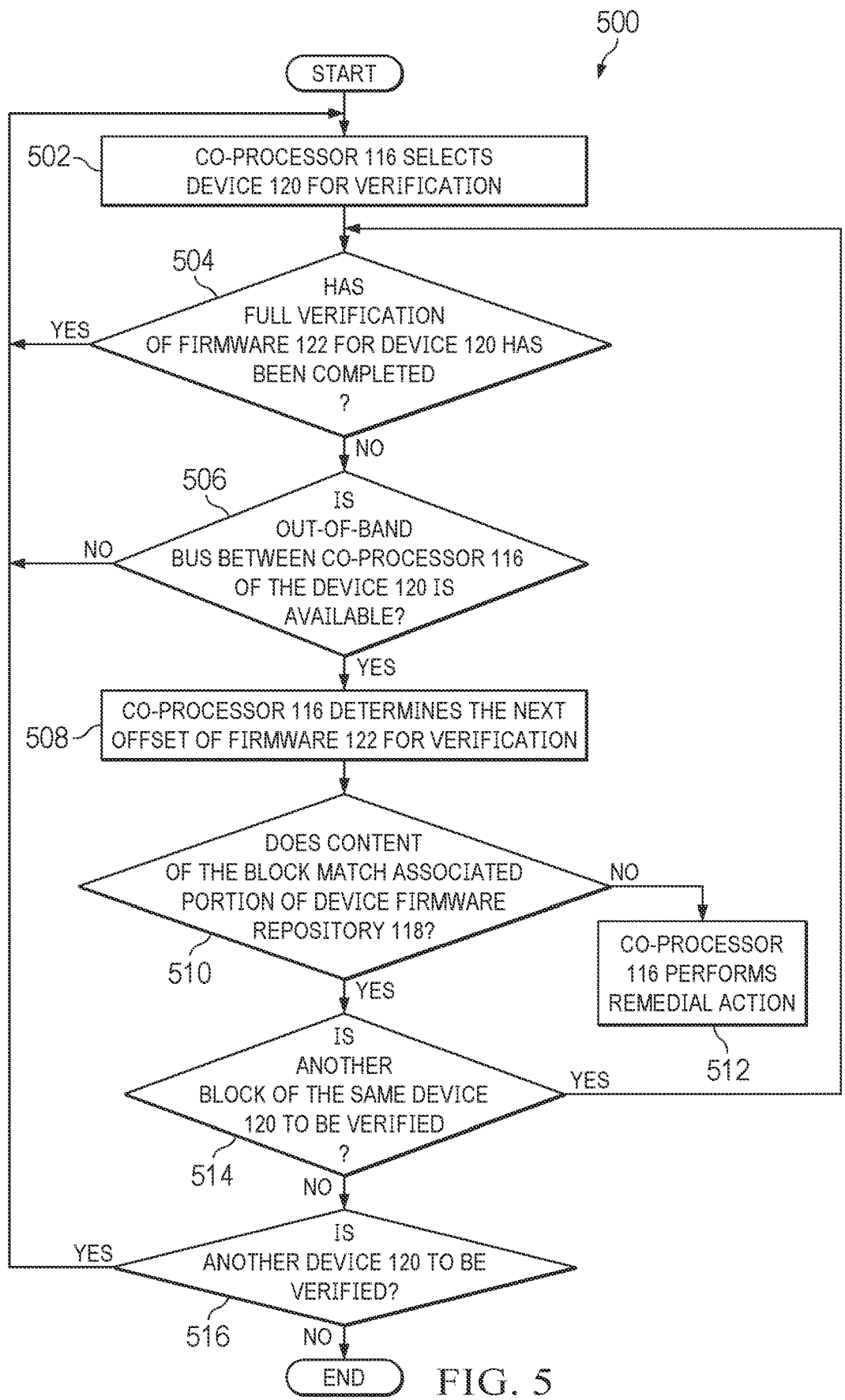
FIG. 5 illustrates a flow chart of a method for a secured boot and scan procedure that may occur while a host system is powered on, in accordance with embodiments of the present disclosure.

FIG. 5 illustrates a flow chart of a method 500 for a secured boot and scan procedure that may occur while host system 98 is powered on, in accordance with embodiments of the present disclosure. According to some embodiments, method 500 may begin at step 502. As noted above, teachings of the present disclosure may be implemented in a variety of configurations of information handling system 102. As such, the preferred initialization point for method 500 and the order of the steps comprising method 500 may depend on the implementation chosen.

At step 502, co-processor 116 may select a device 120 for verification. At step 504, co-processor 116 may determine if a full verification of firmware 122 for device 120 has been completed. If a full verification of firmware 122 for device 120 has been completed, method 500 may proceed again to step 502, where co-processor 116 may select another device 120 for verification. Otherwise, method 500 may proceed to step 506.

At step 506, co-processor 116 may determine if the out-of-band bus between co-processor 116 of the device 120 is available. If available, method 500 may proceed to step 508. Otherwise, method 500 may proceed again to step 504.

At step 508, co-processor 116 may determine the next offset of firmware 122 for verification. At step 510, co-processor 116 may compare the content of the block against the associated portion of device firmware repository 118. If the content matches, method 500 may proceed to step 514. Otherwise, method 500 may proceed to step 512.

At step 512, in response to a failure in the verification of a block of firmware 120, co-processor 116 may perform a remedial action. Such remedial action may include marking the affected firmware 122 for repair. After completion of step 512, method 500 may end.

At step 514, in response to a successful verification of a block of firmware 120, co-processor 116 may determine if another block of the same device 120 is to be verified. If another block of the same device 120 is to be verified, method 500 may proceed again to 504. Otherwise, method 500 may proceed to step 516.

At step 516, processor 113 or trusted integrated processor 114 may determine if another device 120 is to be verified. If another device 120 is to be verified, method 500 may proceed again to 502. Otherwise, method 500 may end.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using information handling system 102 or any other system operable to implement method 500. In certain embodiments, method 500 may be implemented partially or fully in software and/or firmware embodied in computer-readable media.

Following completion of method 500, and upon a subsequent powering down (e.g., transition from state S0 to S5), management controller 112 may cause firmware marked for repair during method 500 to be repaired.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in FIG. 1s and described above, the principles of the present disclosure may be implemented using any number of techniques, whether currently known or not. The present disclosure should in no way be limited to the exemplary implementations and techniques illustrated in FIGURE is and described above.

Unless otherwise specifically noted, articles depicted in FIG. 1s are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system comprising a host system processor; and
   a management controller communicatively coupled to the host system processor and configured to perform out-of-band management of a plurality of devices of the information handling system, and further configured to, during a powering on of the host system:

randomly select a subset of one or more devices of the plurality of devices for partial validation of firmware of the plurality of devices;

randomly select, for each particular device of the subset of one or more devices, at least one offset associated with the firmware of the particular device for partial verification of the firmware; and perform verification of the firmware of each particular device at the at least one offset for the particular device.

2. The information handling system of claim 1, wherein the management controller is further configured to, responsive to determining a failure in verification at a particular offset of the at least one offset for one of the subset of one of more devices:

halt boot of the host system; and perform a remedial action associated with the failure.

3. The information handling system of claim 2, wherein the remedial action comprises one of:

repairing firmware associated with the failure; and logging information associated with the failure.

4. The information handling system of claim 1, wherein the management controller is further configured to randomly select the subset of one or more devices and randomly select the at least one offset for each of the subset of one or more devices based on parameters associated with the plurality of devices and a period of time for the boot of the host system.

5. The information handling system of claim 4, wherein the parameters comprise a number of the plurality of devices and sizes of firmware of the plurality of devices.

6. The information handling system of claim 1, wherein following boot of the host system, the management controller is further configured to:

continue randomly selecting devices and additional offsets for partial validation of firmware of the plurality of devices; and responsive to determining a failure in verification at an additional offset, flag firmware for a device associated with the failure for repair at a later time when the host system is powered down.

7. The information handling system of claim 6, wherein the steps of continuing randomly selecting devices and additional offsets and flagging firmware for repair are performed by a co-processor of the management controller.

8. A method, in an information handling system comprising a host system comprising a host system processor and a management controller communicatively coupled to the host system processor and configured to perform out-of-band management of a plurality of devices of the information handling system, the method comprising, during a powering on of the host system:

randomly selecting, by the management controller, a subset of one or more devices of the plurality devices for partial validation of firmware of the plurality of devices;

randomly selecting, by the management controller, for each particular device of the subset of one or more devices, at least one offset associated with the firmware of the particular device for partial verification of the firmware; and performing, by the management controller, verification of the firmware of each particular device at the at least one offset for the particular device.

9. The method of claim 8, further comprising, responsive to determining a failure in verification at a particular offset of the at least one offset for one of the subset of one of more devices:

halting, by the management controller, boot of the host system; and performing, by the management controller, a remedial action associated with the failure.

10. The method of claim 9, wherein the remedial action comprises one of:

repairing firmware associated with the failure; and logging information associated with the failure.

11. The method of claim 8, further comprising randomly selecting the subset of one or more devices and randomly selecting the at least one offset for each of the subset of one or more devices based on parameters associated with the plurality of devices and a period of time for the boot of the host system.

12. The method of claim 11, wherein the parameters comprise a number of the plurality of devices and sizes of firmware of the plurality of devices.

13. The method of claim 8, further comprising, following boot of the host system:

continuing, by the management controller, randomly selecting devices and additional offsets for partial validation of firmware of the plurality of devices; and responsive to determining a failure in verification at an additional offset, flagging, by the management controller firmware for a device associated with the failure for repair at a later time when the host system is powered down.

14. The method of claim 13, wherein the steps of continuing randomly selecting devices and additional offsets and flagging firmware for repair are performed by a co-processor of the management controller.

15. An article of manufacture comprising:

a non-transitory computer-readable medium; and computer-executable instructions carried on the computer-readable medium, the instructions readable by a processing device, the instructions, when read and executed, for causing the processing device to, in an information handling system comprising a host system comprising a host system processor and a management controller communicatively coupled to the host system processor and configured to perform out-of-band management of a plurality of devices of the information handling system, during a powering on of the host system:

randomly select, by the management controller, a subset of one or more devices of the plurality devices for partial validation of firmware of the plurality of devices;

randomly select, by the management controller, for each particular device of the subset of one or more devices, at least one offset associated with the firmware of the particular device for partial verification of the firmware; and perform, by the management controller, verification of the firmware of each particular device at the at least one offset for the particular device.

16. The article of claim 15, the instructions for further causing the processor device to, responsive to determining a failure in verification at a particular offset of the at least one offset for one of the subset of one of more devices:

halt, by the management controller, boot of the host system; and perform, by the management controller, a remedial action associated with the failure.

17. The article of claim 16, wherein the remedial action comprises one of:
  repairing firmware associated with the failure; and
  logging information associated with the failure.

18. The article of claim 15, the instructions for further causing the processing device to randomly select the subset of one or more devices and randomly select the at least one offset for each of the subset of one or more devices based on parameters associated with the plurality of devices and a period of time for the boot of the host system.

19. The article of claim 18, wherein the parameters comprise a number of the plurality of devices and sizes of firmware of the plurality of devices.

20. The article of claim 15, the instructions for further causing the processing device to, following boot of the host system:
  continue, by the management controller, randomly selecting devices and additional offsets for partial validation of firmware of the plurality of devices; and
  responsive to determining a failure in verification at an additional offset, flag, by the management controller firmware for a device associated with the failure for repair at a later time when the host system is powered down.

21. The article of claim 20, wherein the steps of continuing randomly selecting devices and additional offsets and flagging firmware for repair are performed by a co-processor of the management controller.

* * * * *